US012687323B2

(12) United States Patent      (10) Patent No.:    US 12,687,323 B2
Xiao et al.                        (45) Date of Patent:        Jul. 21, 2026

(54) PARTICLE SOLAR RECEIVER

(71) Applicant: Zhejiang University, Hangzhou (CN)

(72) Inventors: Gang Xiao, Hangzhou (CN); Xiangyu Xie, Hangzhou (CN); Di Gan, Hangzhou (CN); Mingjiang Ni, Hangzhou (CN)

(73) Assignee: Zhejiang University, Hangzhou (CN)

( * ) Notice: Subject to any disclaimer, the term of this patent is extended or adjusted under 35 U.S.C. 154(b) by 370 days.

(21) Appl. No.: 18/555,101

(22) PCT Filed: Mar. 21, 2022

(86) PCT No.: PCT/CN2022/081963
§ 371 (c)(1),
(2) Date: Oct. 12, 2023

(87) PCT Pub. No.: WO2022/218105
PCT Pub. Date: Oct. 20, 2022

(65)          Prior Publication Data
US 2024/0125516 A1      Apr. 18, 2024

(30)      Foreign Application Priority Data
Apr. 13, 2021    (CN) .......................... 202110391974.7

(51) Int. Cl.
*F24S 10/50*          (2018.01)
*F24S 20/20*          (2018.01)
(Continued)

(52) U.S. Cl.
CPC ............. *F24S 21/00* (2018.05); *F24S 10/502* (2018.05); *F24S 20/20* (2018.05); *F24S 50/40* (2018.05)

(58) Field of Classification Search
CPC .......... F24S 21/00; F24S 10/502; F24S 20/20; F24S 50/40
(Continued)

(56)          References Cited

U.S. PATENT DOCUMENTS 4,158,385 A * 6/1979 Vandenhoeck ......... F28D 19/02
                                               165/300

FOREIGN PATENT DOCUMENTS

CN          101122422 A      2/2008
CN            012014      * 1/2014
(Continued)

OTHER PUBLICATIONS

WO 2019204337 machine translation Oct. 24, 2019.*
(Continued)

*Primary Examiner* — Avinash A Savani
(74) *Attorney, Agent, or Firm* — David D. Brush; Westman, Champlin & Koehler, P.A.

(57)          ABSTRACT

Receiving and storage of energy, and particularly a particle solar receiver for solar thermal power generation. The particle solar receiver includes: a feeding bin temporarily storing endothermic particles to be heated, and a multi-stage plate heat absorbing channel allowing the particles to flow along a predetermined path by gravity, where the multi-stage plate heat absorbing channel includes a plurality of plate-type structures which forms a changing flow direction of the particles flowing between adjacent plate-type structures. The particle solar receiver can achieve the endothermic particle heating function with a simple structure, i.e., the function of converting the solar power into thermal energy at a high-temperature level.

9 Claims, 10 Drawing Sheets

(51) Int. Cl.
 *F24S 21/00* (2018.01)
 *F24S 50/40* (2018.01)

(58) Field of Classification Search
 USPC ......................................................... 126/585
 See application file for complete search history.

(56) References Cited

FOREIGN PATENT DOCUMENTS

| | | | | | |
|---|---|---|---|---|---|
| CN | 203405069 | U | 1/2014 | | |
| CN | 110057119 | A | 7/2019 | | |
| CN | 113007911 | A | 6/2021 | | |
| CN | 113154707 | A | 7/2021 | | |
| CN | 216144016 | U | 3/2022 | | |
| WO | WO-2019204337 | A1 * | 10/2019 | .............. | F24S 80/20 |
| WO | WO-2019213353 | A1 * | 11/2019 | .............. | F24S 80/20 |

OTHER PUBLICATIONS

WO 2019213353 machine translation Nov. 7, 2019.*
CN 203405069 machine translation Jan. 22, 2014.*
International Search Report dated May 27, 2022 for corresponding International Application No. PCT/CN2022/081963, filed Mar. 21, 2022.
Written Opinion of the International Searching Authority dated May 27, 2022 for corresponding International Application No. PCT/CN2022/081963, filed Mar. 21, 2022.
English translation of the Written Opinion of the International Searching Authority dated May 27, 2022 for corresponding International Application No. PCT/CN2022/081963, filed Mar. 21, 2022.

* cited by examiner

PARTICLE SOLAR RECEIVER

CROSS-REFERENCE TO RELATED APPLICATIONS

This Application is a Section 371 National Stage Application of International Application No. PCT/CN2022/081963, filed Mar. 21, 2022, which is incorporated by reference in its entirety and published as WO 2022/218105 A1 on Oct. 20, 2022, not in English.

TECHNICAL FIELD

The present disclosure relates to the technical field of the receiving and storage of energy, in particular to a particle solar receiver for solar thermal power generation.

BACKGROUND ART

The development of energy utilization methods represents the development of human civilization in a manner. At present, the world's energy consumption is still dominated by non-renewable energy, of which the energy consumption of coal, oil and natural gas accounts for 84.3%. The massive consumption of fossil energy has caused great harm to the earth's ecological environment. Renewable energy, especially solar power, which has the advantages of adequacy, cleanliness, and safety, has attracted extensive attention of scientific researchers.

Specifically, the solar power generation technology mainly includes photovoltaic power generation, solar thermal power generation and solar chimney power generation, etc. Among them, solar thermal power generation is a technology that converts collected solar power into thermal energy for power generation. In solar thermal power generation, using particles as the working medium is generally considered by the scientific research community as one of the new generation advantageous technologies, which has the following advantages: the particles can work stably at 700° C. or even above 1000° C., thus supporting the high-temperature power generation process, such as supercritical Rankine cycle power generation, supercritical CO2 Brayton cycle power generation, etc.; the particles can not only be used as the endothermic medium, but also the thermal storage medium, thereby lowering the cost and improving the efficiency for the whole system; the particles are easy to obtain and relatively low in price; the high-temperature particles can be used not only for power generation, but also for thermal-chemical processes such as hydrogen production, coal gasification, etc.; the particles have lower risk of low-temperature solidification and high-temperature decomposition than molten salts and thus obviously have better safety and stability.

A solar receiver is the component of converting solar power into thermal energy in solar thermal power generation technology, whose operational performance directly affects the safety, stability, and efficiency of the whole solar thermal power generation system. Currently, the typical types of particle solar receivers include free-falling particle solar receivers, obstructive-flow particle solar receivers, centrifugal particle solar receivers, quartz-tube particle solar receivers, single inclined plate particle solar receivers, etc. Although all kinds of particle solar receivers have their own advantages and significance, they also have some problems. For example, the particle flow rate of the free-falling particle solar receivers is too high and thus the residence time is short, which leads to insufficient temperature rise; the obstructive structures of the obstructive-flow particle solar receivers are prone to wear out and deform at a high temperature; the centrifugal particle solar receivers are complicated in structure and need to be driven by external power; the quartz glass of the quartz-tube particle solar receivers is prone to be damaged and contaminated; the single inclined plate particle solar receivers have the problem of the too thick particle layer at the end of the inclined plate and the difficulty to match upward concentrating solar power.

Therefore, how to design a solar receiver to achieve controllable temperature rise of particles with a simple structure, so as to safely and stably convert solar power into thermal energy inside high-temperature particles, is a problem in existing technologies.

SUMMARY OF THE DISCLOSURE

In response to the above problems, the present disclosure provides a particle solar receiver for solar thermal power generation, which can achieve temperature rise of particles, i.e., convert solar power into thermal energy at a high-temperature level, with a relatively simple structure.

Core components of the particle solar receiver provided by the present disclosure include: a feeding bin temporarily storing endothermic particles to be heated, and a multi-stage plate heat absorbing channel allowing the endothermic particles to flow along a predetermined path by gravity. The multi-stage plate heat absorbing channel includes a plurality of plate-type structures, and the flow direction of the endothermic particles flowing between adjacent plate-type structures would change.

According to the particle solar receiver provided by the present disclosure, the feeding bin can store a certain amount of endothermic particles temporarily, thus buffering the particles entering the solar receiver. The multi-stage plate heat absorbing channel allows the endothermic particles to flow along the predetermined path by gravity, where the endothermic particles are heated by concentrated solar power. The multi-stage plate heat absorbing channel including the plurality of plate-type structures can increase the total flowing distance of the endothermic particles and thus prolong the heating time by concentrated solar power, so that the endothermic particles can sufficiently absorb the concentrated solar power. In addition, incident rays can also undergo multiple absorption and reflection between the multi-stage plate-type structures, so that the particles can fully absorb the concentrated solar power; consequently, the average length of each stage in the multi-stage structure can be relatively reduced, thus reducing the inefficient heat absorbing region, reducing the particle layer thickness at the end of each inclined plate and saving space.

As a result, the particle solar receiver provided by the present disclosure can achieve the endothermic particle heating function with a simple structure, i.e., the function of converting the solar power into thermal energy at a high-temperature level.

In an exemplary technical solution of the present disclosure, the plurality of plate-type structures are any of the following: the plurality of plate-type structures are all inclined plates, and the endothermic particles can flow on the inclined plate; the plurality of plate-type structures are all sandwich layers, and the sandwich layers each have an upper plate and a lower plate, between which the endothermic particles can flow; the plurality of plate-type structures are formed by combining the inclined plates and the sandwich layers, the sandwich layer has the upper plate and the lower plate, and the endothermic particles can flow on the inclined plate or in the sandwich layer.

According to the exemplary technical solution, the present disclosure refers to the plate-type structure that is directly exposed to and heated by the concentrated solar power as a direct irradiating plate, and the direct irradiating plate includes, but is not limited to, the inclined plate or the lower plate of the sandwich layer. The direct irradiating plate can be correspondingly modified to enhance transmission, reflection or absorption to improve the overall solar receiver efficiency.

According to the exemplary technical solution, the direct irradiating plate can be made of quartz glass, which has high transmittance and good thermal stability, so that most of the concentrated solar power irradiating the direct irradiating plate can transmit and then directly heat the endothermic particles on the back side of the direct irradiating plate, while a small part of the concentrated solar power is reflected by the direct irradiating plate and the endothermic particles on the back side of the direct irradiating plate, thus heating the endothermic particles of the next-stage plate-type structure.

According to the exemplary technical solution, the direct irradiating plate can be made of a ceramic reflective plate, which has high reflectivity and good thermal stability, so that most of the concentrated solar power irradiating the direct irradiating plate is reflected by the ceramic reflective plate, and then heat the endothermic particles of the next-stage plate-type structure, and a small part of the concentrated solar power is absorbed by the ceramic reflective plate and converted into the thermal energy of the ceramic reflective plate, thus indirectly heating the endothermic particles on the back side of the ceramic reflective plate.

According to the exemplary technical solution, the direct irradiating plate can be coated with a high temperature-resistant far-infrared radiation coating, which can improve the absorptivity of the surface of the direct irradiating plate and has good thermal stability, so that most of the concentrated solar power is absorbed by the direct irradiating plate and converted into the thermal energy of the direct irradiating plate, thus indirectly heating the endothermic particles on the back side of the direct irradiating plate. In order to improve the indirect heating efficiency, for the modification of enhancing the absorption rate, the direct irradiating plate should be selected as thin and with good thermal conductivity as much as possible.

According to the exemplary technical solution, the above three types of modification solutions for the direct irradiating plate can be used alone or in combination for maximum benefit.

In an exemplary technical solution of the present disclosure, a baffle is additionally installed on the plate-type structure.

According to the exemplary technical solution, taking the inclined plate whose upper particle layer surface is heated as an example, the baffle is additionally installed on the inclined plate to ensure that only the endothermic particles higher than the baffle pass through, thus dividing the particle layer into an non-circulating particle layer lower than the baffle and an effective circulating particle layer higher than the baffle. After the installation of the baffle, the thickness of the effective circulating particle layer is reduced, thus alleviating the problem of the particle layer being too thick at the end of the inclined plate in traditional single plate particle solar receivers.

In an exemplary technical solution of the present disclosure, an aperture (the aperture is the entrance of solar power into the solar receiver) is arranged opposite to the multi-stage plate heat absorbing channel, a transparent window is detachably installed in the aperture, and the material of the transparent window should have high transmittance and thermal stability, including, but not limited to quartz glass.

According to the exemplary technical solution, the transparent window can be used to isolate the external wind and rain, avoid the loss of internal particles and reduce the heat loss of the solar receiver, and the transparent window is detachably installed in the aperture, so that the transparent window can be installed or disassembled according to the actual needs, so as to maximize the efficiency while ensuring the safe and stable operation of the particle solar receiver.

In an exemplary technical solution of the present disclosure, the particle solar receiver further includes a temperature control device, connecting funnels receiving the endothermic particles from the multi-stage plate heat absorbing channel, and a storage bin connected to the connecting funnel.

According to the exemplary technical solution, the temperature control device can adjust the flow of particles, particle temperature distribution and outlet particle temperature according to the real-time operating condition, the connecting funnels are V-shaped to connect two circulating sections with different calibers, and the storage bin has a certain capacity and can be used for temporarily storing the high-temperature heated endothermic particles.

In the exemplary technical solution of the present disclosure, the temperature control device includes flow control valves, temperature sensors and processors, the connecting funnels are connected to the flow control valves, so the flow control valves can control the flow of particles through the corresponding connecting funnels, the temperature sensors are set at the temperature measurement points on the connecting funnels and/or the multi-stage plate heat absorbing channel, and the processors receive the temperature signals from the temperature sensors and output control signals to the flow control valves.

According to the exemplary technical solution, the temperature sensors are set at the important temperature measurement points of the connecting funnels and/or the multi-stage plate heat absorbing channel to monitor the particle temperature at various parts of the solar receiver and send the temperature signals to the processors. The processors output the control signals to the flow control valves according to the actual operating requirements, and the temperatures of the endothermic particle of various parts of the solar receiver are adjusted by the flow control valves.

In an exemplary technical solution of the present disclosure, a plurality of connecting funnels are set, and a plurality of flow control valves are also correspondingly set.

According to the exemplary technical solution, the flow control valves control the particle flow rates through the corresponding connecting funnels, thereby controlling the particle flow rates in the multi-stage plate heat absorbing channel right opposite to each connecting funnel, and ultimately adjusting the particle temperature of each part of the solar receiver.

BRIEF DESCRIPTION OF THE DRAWINGS

FIG. 9(*b*) is a schematic view of the principle of the action of a baffle at the end of the inclined plate;

LIST OF REFERENCE NUMERALS

1—feeding bin; 2—multi-stage plate heat absorbing channel; 20—sandwich layer; 200—upper plate of the sandwich layer; 201—lower plate of the sandwich layer; 2010—quartz glass transmission plate; 2011—ceramic reflective plate; 21—inclined plate; 22—baffle; 3—connecting funnel; 4—temperature control device; 40—flow control valve; 41—temperature sensor; 42—processor; 43—electric pulling rod; 5—transparent window; 6—storage bin; 7—heliostat field; 8—heat absorbing tower; 9—aperture; a—particle flow direction; b—sunlight irradiation path; c—heat flow direction; point D-radiant energy absorption and reflection point; point E-radiant energy absorption and reflection point.

DETAILED DESCRIPTION

The technical solutions in embodiments of the present disclosure will be clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments in the present disclosure without creative efforts shall fall within the protection scope of the present disclosure.

Embodiments of the present disclosure are described below with reference to the accompanying drawings.

Figure 1:
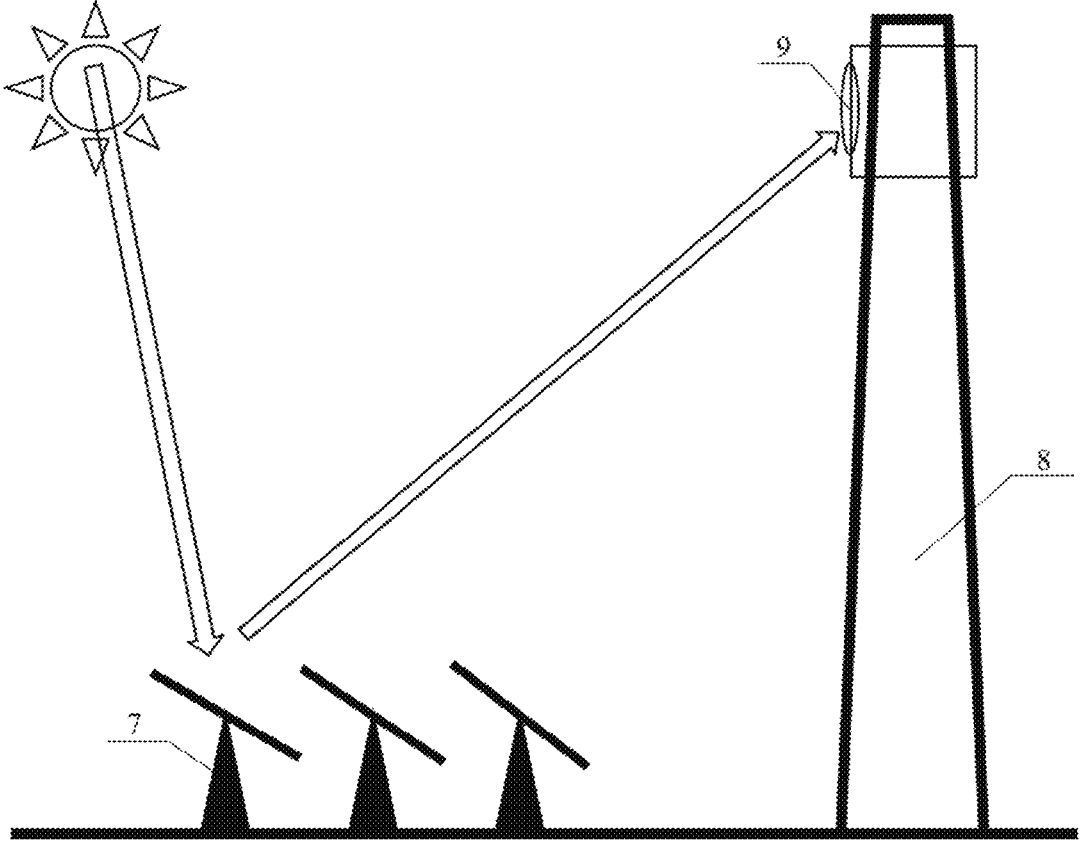
FIG. 1 is a schematic view of a way for utilizing concentrated solar power according to an embodiment of the present disclosure.

FIG. 1 is a schematic diagram of a way for utilizing concentrated solar power of the present disclosure. As shown in FIG. 1, a device for converting solar power into thermal energy mainly includes two parts, i.e., a solar concentrating part and a solar receiving part. According to a solar receiver, after sunlight is focused through heliostat fields 7, the sunlight is concentrated to irradiate particles inside a heat absorbing tower 8 through an aperture 9, thus heating endothermic particles inside the solar receiver, and the heated endothermic particles can enter other devices such as a heat exchanger for heat transfer, thus further utilizing the thermal energy inside the particles.

Figure 2:
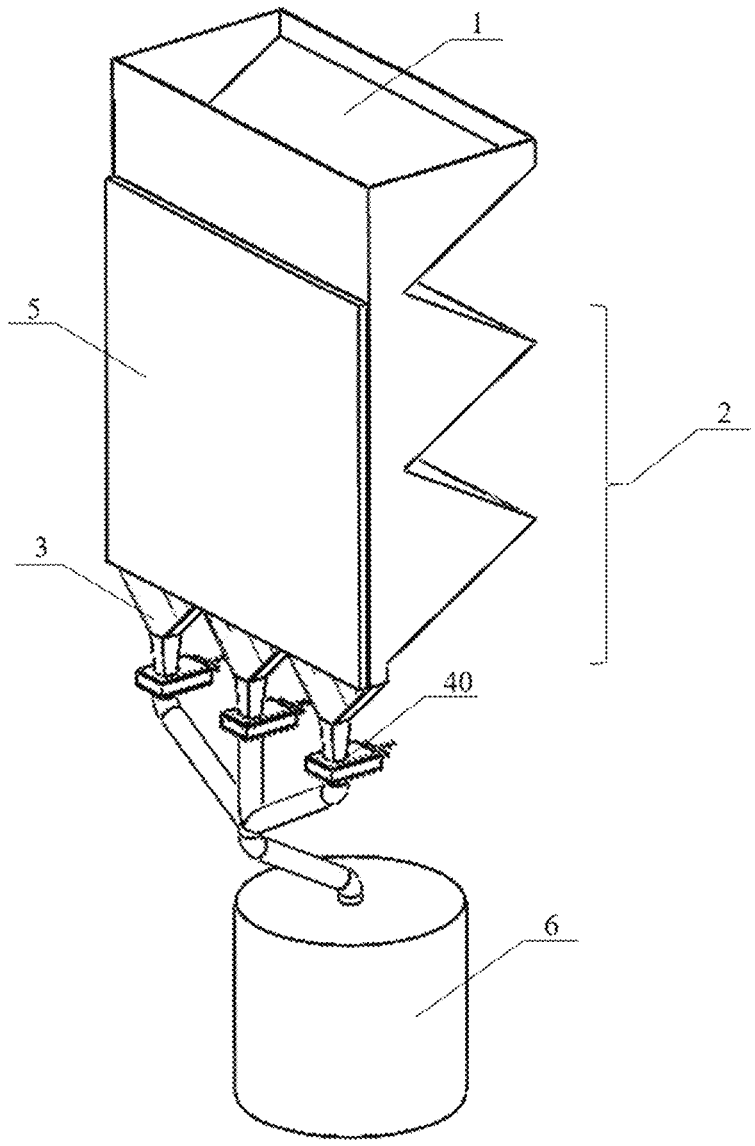
FIG. 2 is a schematic view of the overall structure of a particle solar receiver for tower-type concentrating system in an embodiment of the present disclosure.
Figure 3:
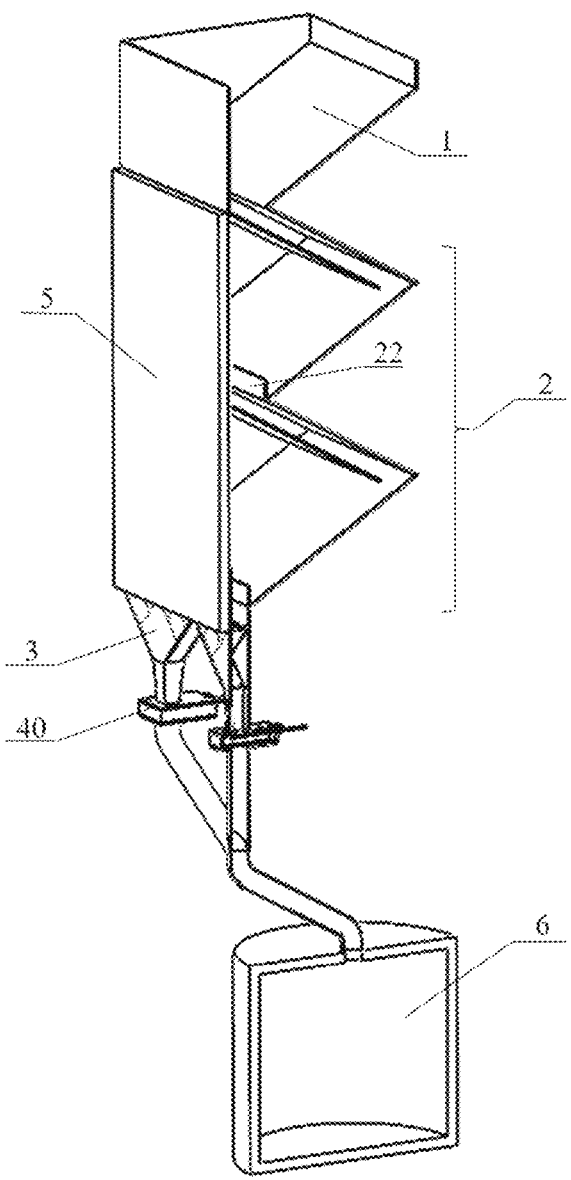
FIG. 3 is an isometric side sectional view of the particle solar receiver for tower-type concentrating system in the embodiment of the present disclosure.

FIG. 2 is a schematic view of the overall structure of a particle solar receiver for tower-type concentrating system of the present disclosure, and FIG. 3 is an isometric side sectional view of the particle solar receiver for tower-type concentrating system of the present disclosure. In combination with FIG. 2 and FIG. 3, it can be seen that the particle solar receiver provided in the present disclosure includes: a feeding bin 1 temporarily storing endothermic particles to be heated, a multi-stage plate heat absorbing channel 2 allowing particles to flow along a predetermined path by gravity and to be heated by concentrated solar power in the process, connecting funnels 3 connecting the multi-stage plate heat absorbing channel 2 with flow control valves 40, and a storage bin 6 temporarily storing high-temperature particles at an outlet.

According to the particle solar receiver provided in the embodiment, the feeding bin 1 has a certain capacity, the endothermic particles firstly entering the feeding bin 1 from the outside are buffered and temporarily stored in the feeding bin 1; then the endothermic particles enter the multi-stage plate heat absorbing channel 2 through a slit (not shown in the figure) by gravity and flow downwards stage by stage along the predetermined path within the multi-stage plate heat absorbing channel 2 by gravity, in the process, the endothermic particles are heated by the concentrated solar power entering through a transparent window 5, and finally, the heated endothermic particles enter the connecting funnels 3 from the end of the multi-stage plate heat absorbing channel 2, where the multi-stage structure of the multi-stage plate heat absorbing channel 2 can increase the flowing distance of the endothermic particles and prolong the heating time by the concentrated solar power, so that the endothermic particles can sufficiently absorb the concentrated solar power. In addition, incident rays can also undergo multiple absorption and reflection between the multi-stage structures, so that the particles can fully absorb the solar power; finally, the average length of each stage in the multi-stage structure can be relatively reduced, thus reducing an inefficient heat absorbing region, reducing the particle layer thickness at the end of each inclined plate and saving space.

Thus, the particle solar receiver provided by the present disclosure can achieve temperature rise of endothermic particle with a simple structure, i.e., convert solar power into thermal energy at a high-temperature level.

Figure 4:
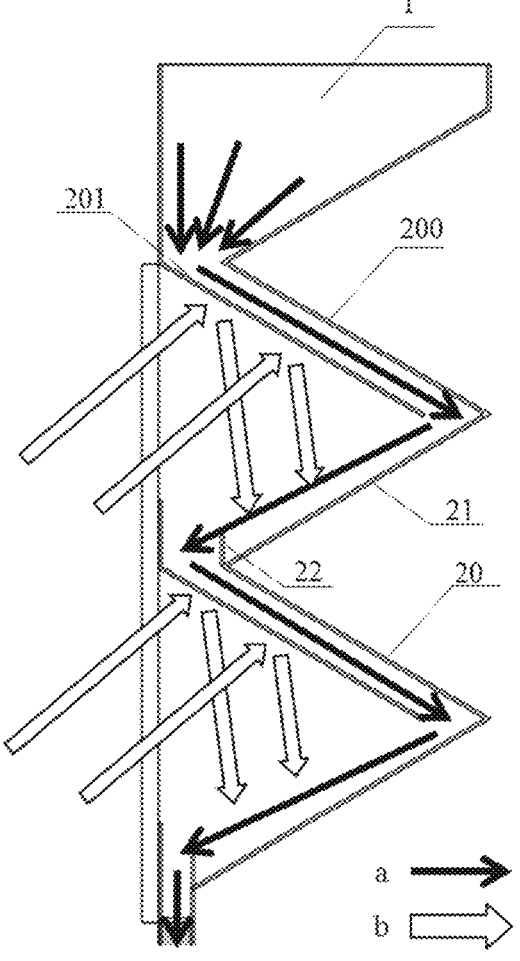
FIG. 4 is a schematic view of internal particle flow and optical route of a plate-type structure of a multi-stage plate heat absorbing channel of the particle solar receiver for tower-type concentrating system in an embodiment of the present disclosure.
Figure 5:
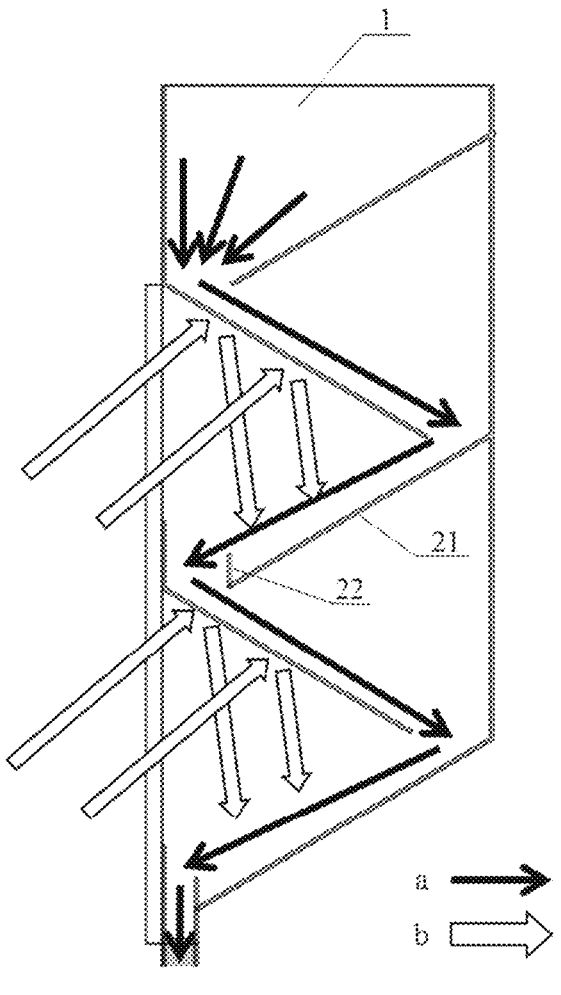
FIG. 5 is a schematic view of internal particle flow and optical route of another plate-type structure in an embodiment of the present disclosure.
Figure 6:
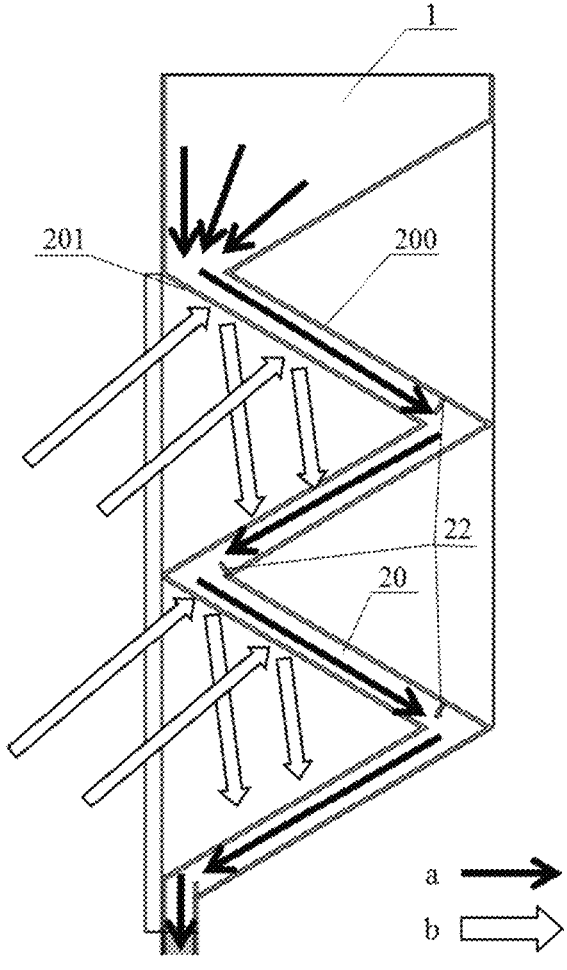
FIG. 6 is a schematic view of internal particle flow and optical route of a still another plate-type structure in an embodiment of the present disclosure.

FIG. 4 to FIG. 6 are schematic views of internal particle flow and optical routes of three kinds of plate-type structures of the multi-stage plate heat absorbing channel 2 of the particle solar receiver for tower-type concentrating system in the embodiment of the present disclosure.

Referring to FIG. 4, the multi-stage plate heat absorbing channel 2 includes a plurality of plate-type structures, the plurality of plate-type structures are formed by alternating adjacent inclined plates 21 and sandwich layers 20, the sandwich layer 20 has an upper plate 200 and a lower plate 201, and the upper plate 200 and the lower plate 201 are arranged adjacently for the endothermic particles to pass therebetween. When sunlight directly irradiates from below in FIG. 4, the lower plate 201 is called a direct irradiating plate. However, the present disclosure is not limited to the case where the lower plate 201 is the direct irradiating plate as shown in FIG. 4. It can be understood by those skilled in the art that the direct irradiating plate is a plate-type structure directly exposed to and heated by the concentrated solar power, so that a person skilled in the art can select a reasonable position of the direct irradiating plate in practical application according to the angle of incidence of sunlight based on the technical solution of the present disclosure.

In the embodiment, the endothermic particles pass through the sandwich layer 20 and the inclined plate 21 in turn by gravity, the sandwich layer 20 and the inclined plate 21 are arranged alternately, and the angles of the sandwich layer 20 and the inclined plate 21 are both about 5° larger than the angle of repose of the particles. Arranging the inclined plate 21 and the sandwich layer 20 realizes multi-stage utilization of the concentrated solar power and improves the utilization efficiency of the concentrated solar power.

In some embodiments of the present disclosure, more preferably, the lower plate 201 is made of quartz glass.

Specifically, the lower plate 201 made of quartz glass is referred to as a quartz glass transmission plate 2010, and the quartz glass transmission plate 2010 should have high transmittance and good thermal stability.

Figures 7, 8:
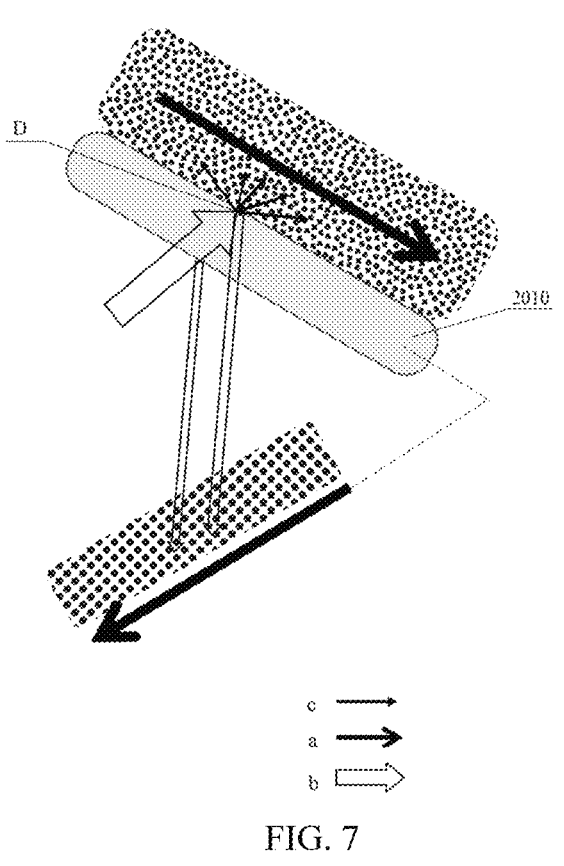
FIG. 7 is a schematic view of the solar power absorption and reflection process at point D based on a quartz glass transmission plate.
FIG. 8 is a schematic view of the solar power absorption and reflection process at point E based on a ceramic reflective plate.

FIG. 7 is a schematic view of the solar power absorption and reflection process at point D based on the quartz glass transmission plate 2010, where a is a particle flow direction, b is a sunlight path, and c is a heat flow direction. Specifically, most of the concentrated solar power incident to the quartz glass transmission plate 2010 will transmit the quartz glass transmission plate 2010 to heat the endothermic particles inside the sandwich layer 20, a small part of the concentrated solar power is reflected by the quartz glass transmission plate 2010, and most of the transmitted concentrated solar power can be absorbed by a flowing particle layer on the back side of the quartz glass transmission plate 2010, and a small part of the transmitted concentrated solar power is reflected by the flowing particle layer. Most of the above reflected concentrated solar power is absorbed by the flowing particle layer on the next-stage inclined plate 21 below sandwich layer 20, and a small part of the above reflected concentrated solar power escapes after multiple reflection. By means of the characteristic of high transmittance of the quartz glass, the lower plate 201 in the embodiment makes most of the solar power concentrated by the heliostat field 7 pass through the lower plate 201 to be absorbed directly by the endothermic particles, and since the endothermic particles need to work stably at 700° C. or even above 1000° C., due to the higher thermal stability of the quartz glass, the lower plate 201 can be more resistant to high temperature, preventing the case where the lower plate 201 deforms at a high temperature in the working process, and consequently the solar power cannot be safely and stably converted into thermal energy to be used.

In some other embodiments of the present disclosure, more preferably, the lower plate 201 can also be made of a ceramic reflective plate 2011, with the difference from the above embodiment that the original quartz glass transmission plate 2010 is replaced with the ceramic reflective plate 2011.

FIG. 8 is a schematic view of the solar power absorption and reflection process at point E based on the ceramic reflective plate 2011, where a is a particle flow direction, b is a sunlight path, and c is a heat flow direction. Specifically, most of the concentrated solar power incident to the ceramic reflective plate 2011 is reflected by the ceramic reflective plate 2011, and most of the reflected radiant energy is absorbed by the flowing particle layer on the next-stage inclined plate 21 below the sandwich layer 20, and a small part of the reflected radiant energy escapes after multiple reflection. The concentrated solar power absorbed by the ceramic reflective plate 2011 is converted into the thermal energy of the ceramic reflective plate 2011, then indirectly heating the flowing particles in the sandwich layer 20.

Specifically, in the embodiment, the lower plate 201 of the sandwich layer 20 in the multi-stage plate heat absorbing channel 2, which carries the particles and is directly radiated by the concentrated solar power, can be replaced with or additionally provided with a material that increases the reflectivity to direct the part of solar power to heat particles at other positions by means of reflection; the lower plate can also be replaced with a transparent material, thus transmitting the solar power to heat the particles that would otherwise be heated only indirectly. The above two options should be used alone or together, depending on the actual need, so as to match the upward concentrating incidence condition, such as tower type concentrating system.

Other components in the present disclosure, except for the lower plate 201 of the sandwich layer, can choose quartz glass or a ceramic reflective plate as the material, but also 310s stainless steel, a silicon carbide plate, a mullite plate and other high temperature-resistant materials can also be selected according to the actual working condition. In some embodiments of the present disclosure, more preferably, a baffle 22 is additionally installed at the end of the inclined plate 21.

In the embodiment, the baffle 22 allows only endothermic particles higher than the baffle 22 to pass, thus dividing the particle layer into a non-circulating particle layer lower than the baffle 22 and an effective circulating particle layer higher than the baffle 22. After the baffle 22 is added, the thickness of the effective circulating particle layer is reduced, thus alleviating the problem of the particle layer being too thick at the end of an inclined plate 21 for traditional single-stage plate-type particle solar receiver.

Figure 9A:
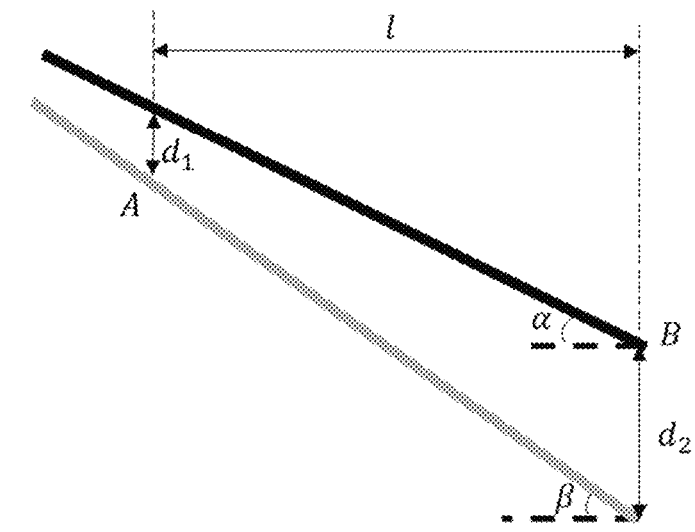
FIG. 9(*a*) is a schematic view of the principle of the too thick particle layer at the end due to the too long path of the single plate.
Figure 9B:
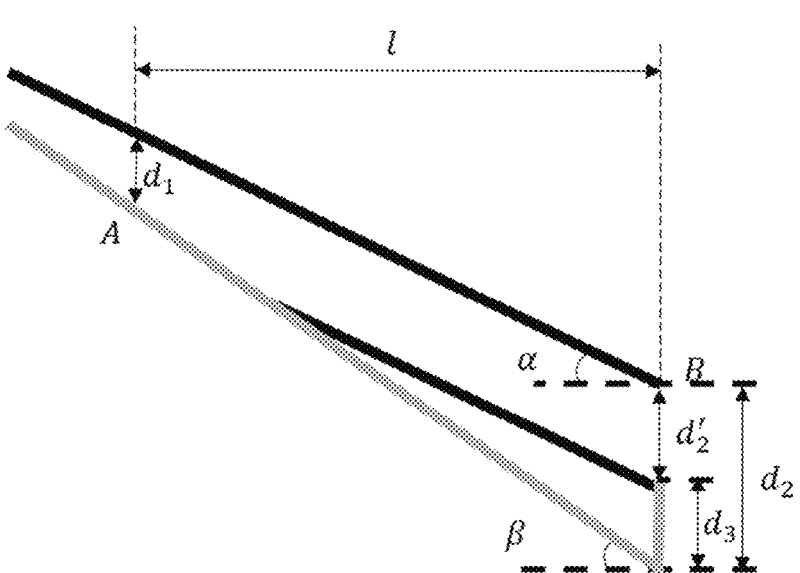

Based on the problem that the particle layer being too thick at the end of the inclined plate 21 for traditional single-stage plate-type particle solar receiver, the reason why the particle layer being too thick at the end of the inclined plate 21 for the single-stage plate-type particle solar receiver is stated here in combination with the accompanying drawings, FIG. 9(*a*) is a schematic view of the principle that because of a too long path of a single plate, a particle layer at the end of each inclined plate is too thick, with reference to FIG. 9(*a*), in order for the particles to flow by gravity, the inclination angle β of the inclined plate 21 should be greater than the angle of repose α of the particles, and in the actual use process, the angle difference value should be more than 2° to ensure the stable flow of the particles. Since the inclination angle β of the inclined plate 21 is greater than the angle of repose α of the particles, when the particles move slowly in the form of a moving bed, the thickness difference of particles at two points A and B at a distance of l is $\Delta d = d_1 - d_2 = l*(\tan \beta - \tan \alpha)$, $\tan \beta - \tan \alpha > 0$, so the thickness of a particle layer flowing down along the inclined plate 21 will gradually increase with the increase of l. Compared with the single-stage plate-type structure, the multi-stage plate-type structure divides the heating path into multiple stages from top to bottom, reducing the path of each stage while the total heating path remains the same, i.e., reducing l in FIG. 9(*a*), and thus alleviating the problem that the particle layer at the end of the inclined plate is too thick. In addition, the present disclosure can further reduce the thickness of the particle layer by the structural improvement design, i.e., the baffle 22 is additionally installed. FIG. 9(*b*) is a schematic diagram of the principle of the action of the baffle 22 at the end of the inclined plate 21, with reference to FIG. 9(*b*), for the problem that the particle layer at the end of the inclined plate is too thick, the baffle 22 with the height d₃ is additionally installed at the end of inclined plate 21, thus allowing only particles higher than the baffle 22 to pass, dividing the particle layer into a non-circulating particle layer lower than the baffle 22 and an effective circulating particle layer higher than the baffle 22. The non-circulating particle layer can be regarded as a thermal insulation material in theory because it will not participate in mass circulation of the system, while by comparing the effective circulating particle layer with the total particle layer, obviously, the thickness of the circulating particle layer is reduced, i.e., after the baffle 22 is additionally installed at the end of the inclined plate, the thickness of the particle layer at the end of the inclined plate becomes: d'₂=d₂−d₃, so by using the multi-stage plate-type structure and additionally installing the baffle 22, compared with the traditional single-stage plate-type structure, the problem that the particle layer at the end of the inclined plate is too thick can be alleviated.

Referring to FIG. 5, the multi-stage plate heat absorbing channel 2 includes a plurality of plate-type structures, the plurality of plate-type structures are all inclined plates 21, and the endothermic particles flow on the inclined plate 21. Part of the inclined plate 21 is a direct irradiating plate in the case where sunlight directly irradiates from below as shown in the example of FIG. 5. The baffle 22 is additionally installed on the inclined plate 21. Preferably, the baffle 22 is formed at the end of the inclined plate. The inclined plate 21 arranged as the direct irradiating plate may be made of quartz glass, or a ceramic reflective plate, or may be coated with a high temperature-resistant far-infrared radiation coating, and the role and function thereof can refer to the above description and will not be repeated.

Referring to FIG. 6, the multi-stage plate heat absorbing channel 2 includes a plurality of plate-type structures, each of the plurality of plate-type structures is a sandwich layer 20, the sandwich layer 20 has an upper plate 200 and a lower plate 201, and the upper plate 200 and the lower plate 201 are arranged adjacent to each other for the endothermic particles to pass therebetween. In the case where sunlight directly irradiates from below as illustrated in FIG. 6, the lower plate 201 is a direct irradiating plate. The baffle 22 is additionally installed on the lower plate 201. Preferably, the baffle 22 is formed at the end of the lower plate 201. The lower plate 201 as the direct irradiating plate may be made of quartz glass, or a ceramic reflective plate, or may be coated with a high temperature-resistant far infrared radiation coating, and the role and function thereof can refer to the above description and will not be repeated.

Preferably, with reference to FIG. 1 and FIG. 2, an aperture 9 (the aperture is the entrance of solar power into the solar receiver) is provided at a position opposite to the multi-stage plate heat absorbing channel 2, and the transparent window 5 is detachably installed in the aperture 9.

In the embodiment, the transparent window 5 can be used to isolate the external wind and rain, avoid the loss of internal particles and reduce the heat loss of the solar receiver, and the transparent window 5 is detachably installed in the aperture 9, so that the transparent window can be installed or disassembled according to the actual needs, so as to maximize the efficiency while ensuring the safe and stable operation of the particle solar receiver.

Specifically, in the embodiment, the removable transparent window 5 is arranged at the aperture 9, and preferably, the transparent window 5 is made of quartz glass, on the one hand, the transparent window 5 can effectively alleviate the influence of external wind and rain on the normal operation inside the solar receiver, and the removability of the transparent window 5 and the special quartz glass material thereof can also be used to improve the total efficiency of the solar receiver under different incident radiation intensities. Specifically, when the incident radiation intensity is low, the radiation convection loss of the structure inside the solar receiver accounts for the main part of the loss, and installing the transparent window 5 can reduce the radiation convection loss, thus improving the total efficiency of the solar receiver; when the incident radiation intensity is high and the radiation and convection loss of the structure inside the solar receiver accounts for a less part of the loss, but the optical loss caused by the reflection of the transparent window 5 at the aperture 9 of the solar receiver is not negligible, removing the transparent window 5 may instead improve the total efficiency of the solar receiver, the specific selection should be judged according to the specific condition; on the other hand, the transparent window 5 in the embodiment can be removed to facilitate the cleaning and restoration when the transmittance of the transparent window 5 decreases due to dust and water stain.

The transparent window 5 in the embodiment can be made of a quartz glass material, or other high temperature-resistant high-transmittance materials can be selected. In addition, the aperture 9 in the embodiment is rectangular, so the transparent window 5 is also rectangular, when the aperture 9 is in other shapes, the transparent window 5 should also be in the corresponding shape, the transparent window 5 can be a single quartz glass plate, or can be made of multiple quartz glass plates by splicing, as long as it can ensure that most of the radiant energy enters the solar receiver on the premise of isolating the external wind and rain and avoiding the loss of internal particles.

Figure 10:
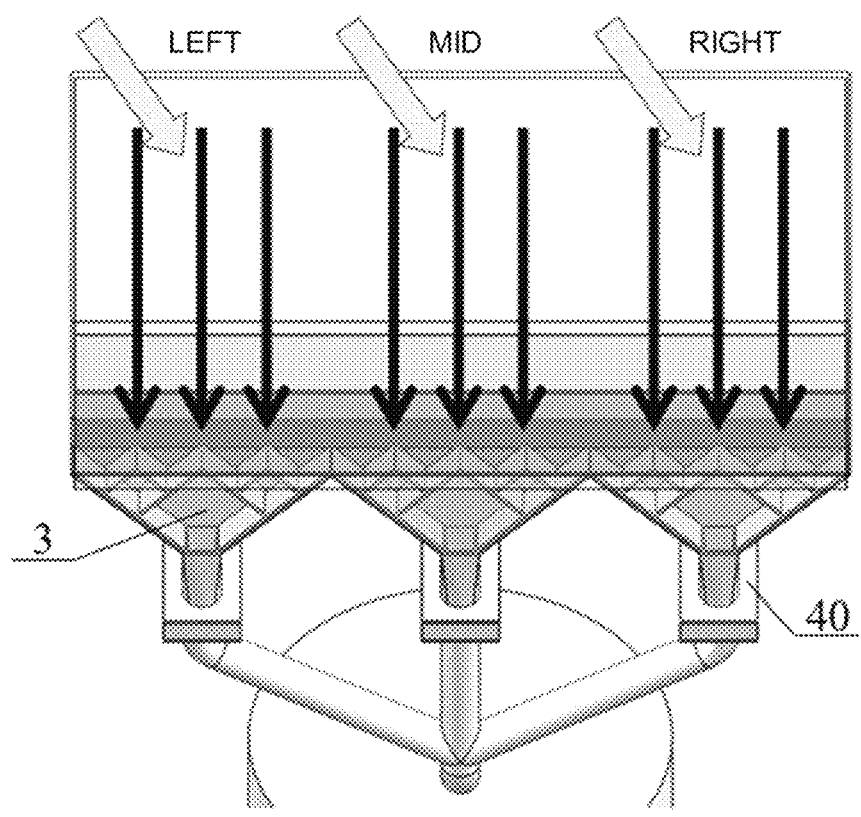
FIG. 10 is a schematic view of the transverse arrangement of connecting funnels and flow control valves according to an embodiment of the present disclosure.
Figure 11:
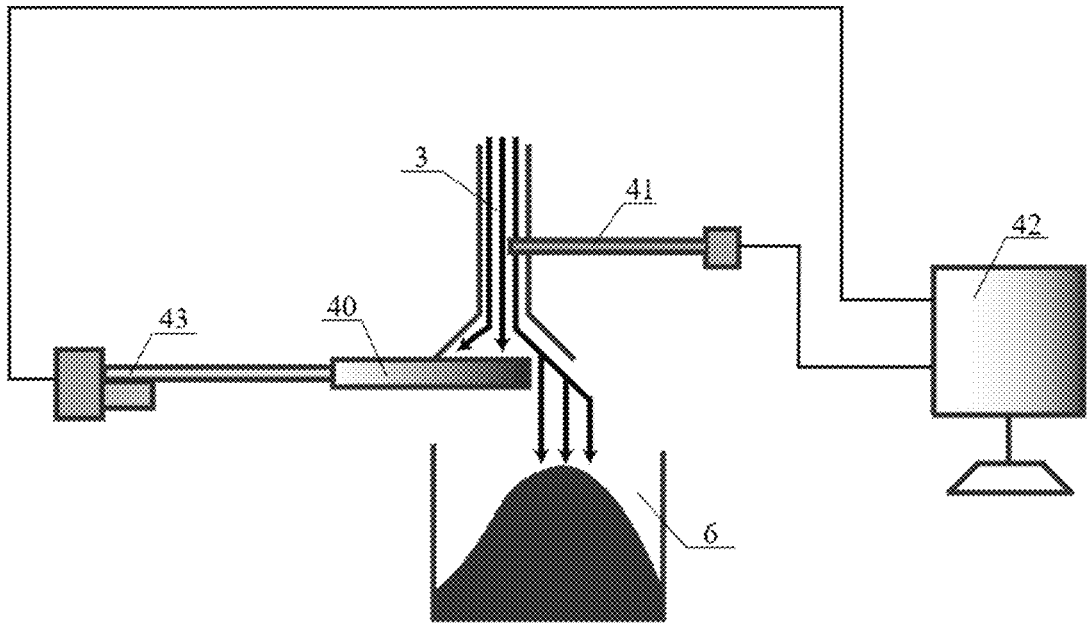
FIG. 11 is a control schematic view of a temperature control device according to an embodiment of the present disclosure.

FIG. 10 is a schematic diagram of the transverse arrangement of connecting funnels 3 and flow control valves 40 of the embodiment of the present disclosure, and FIG. 11 is a schematic diagram of the control of a temperature control device 4 of the embodiment of the present disclosure. Preferably, with reference to FIG. 10 and FIG. 11, the particle solar receiver further includes the temperature control device 4, the connecting funnels 3 and a storage bin 6 connected to the connecting funnel 3. More preferably, the temperature control device 4 includes flow control valves 40, temperature sensors 41 and processors 42, the flow control valves 40 can control the flow of particles, the temperature sensors 41 are set at important temperature measurement points of the connecting funnels 3 and the multi-stage plate heat absorbing channel 2, and the processors 42 receive temperature signals from the temperature sensors 41 and output control signals to the flow control valves 40.

In the embodiment, the temperature control device 4 can adjust the flow of particles, particle temperature distribution and outlet particle temperature according to the real-time operation condition, the connecting funnels 3 is used for the transition of the endothermic particles conveyed from the multi-stage plate heat absorbing channel 2 to the flow control valves 40, and the storage bin 6 has a certain capacity and can be used to temporarily store the high-temperature endothermic particles after absorbing heat. The temperature sensors 41 are set at the important temperature measurement points of the connecting funnels 3 and the multi-stage plate heat absorbing channel 2 to monitor the temperature of the particles at each part of the solar receiver and send the temperature signals to the processors 42. The processors 42 output the control signals to the flow control valves 40 in combination with the actual working condition requirements, and the temperatures of the endothermic particles at each part of the solar receiver are adjusted by means of the flow control valves 40, so as to ensure that the solar receiver can safely and stably operate.

Specifically, referring to FIG. 11, the temperature sensors 41 can monitor the particle temperatures at the ends of the connecting funnels 3 in real time and transmit the temperature signals to the processors 42, and when the monitored particle temperatures are higher than the desired particle temperature, the processors 42 instruct electric pulling rods 43 to perform a shortening operation, thereby driving the flow control valves 40 to open more and increasing the flow of particles through the flow control valves 40, and when the flow of particles increases, the time during which the particles are in the multi-stage plate heat absorbing channel 2 becomes shorter, and thus the average absorption of radiant energy by the particles decreases, thus lowering the particle temperatures until the particle temperatures measured by the temperature sensors 41 are close to the desired particle temperature, and otherwise, the contrary operation can be performed.

The flow control valve 40 in the embodiment may use a pulling plate valve to control the flow of particles. It should be noted that other types of valves, such as pneumatic control valves, can also be used depending on the actual situation, as long as they can serve the function of regulating the flow of particles. The temperature sensor 41 in the embodiment is a sensor that can sense the temperature and convert the temperature into an available output signal, which can be a thermocouple, a thermistor, etc. The processor 42 in the embodiment includes an operational logic component, a register component, an operational unit and a control component, which may be, for example, a computer, etc.

Preferably, referring to FIG. 8, a plurality of connection funnels 3 are arranged, and a plurality of flow control valves 40 are also correspondingly arranged to control the amount of particles flowing through each connecting funnel 3.

In the embodiment, the mass flow of particles in the connecting funnels 3 directly connected to the flow control valves 40 can be controlled by the corresponding flow control valves 40, so as to control the flow of particles in the multi-stage plate heat absorbing channel 2 right opposite to each connecting funnel 3, and finally, the particle temperature of each part is adjusted.

Specifically, as shown in FIG. 10, a total of three connecting funnels 3 on the left, middle and right, a total of three flow control valves 40 on the left, middle and right and three sets of temperature control devices 4 on the left, middle and right are arranged in the transverse direction, and the processor 42 can be common to cope with the unevenness of incident light spot in the transverse direction. In the embodiment, the actual working condition of higher energy flow density in the middle and lower energy flow density on the left and right is used to illustrate the specific way of working: at this time, because of the higher energy flow density in the middle part and lower energy flow density on both sides, the middle particle temperature is higher while the left and right side particle temperature is lower, and the temperatures at the ends of the three connecting funnels 3 on the left, middle and right are monitored in real time, and according to the specific way of working of the above temperature control device 4, the left, middle and right three flow control valves 40 are adjusted, so that the temperature values of the particles at the ends of the left, middle and right three connecting funnels 3 are adjusted to be relatively consistent and close to the desired temperature value.

In addition, it should be added that the particle solar receiver is further provided with a thermal insulation structure (not shown in the figure) to improve the particle temperature and the efficiency of the solar receiver. The thermal insulation structure in the particle solar receiver can be a thermal insulation cover, first of all, the thermal insulation cover (not shown in the figure) in the particle solar receiver is made of high temperature-resistant aluminum silicate ceramic fiber blankets. It can be understood by those skilled in the art that although the thermal insulation cover described in the exemplary embodiment is made of the high temperature-resistant aluminum silicate ceramic fiber blankets, it can be understood that obviously, those skilled in the art can also select other materials and structures with a thermal insulation function by themselves according to actual use requirements. Secondly, bauxite ceramist sand and iron-manganese oxide particles are used as the endothermic particles in the embodiment, because the bauxite ceramist sand is cheap and easily obtainable, and has good high temperature resistance, while the doping of iron-manganese oxide can enhance the overall specific heat capacity of a working medium, thus reducing the subsequent thermal storage space and thermal storage cost. Although the bauxite ceramist sand and iron-manganese oxide particles are used in the embodiment as the working medium, but the present disclosure is not limited to these. Obviously, those skilled in the art can also select other particles with a high absorption rate and high temperature resistance according to the actual use requirements.

The description is only exemplary embodiments of the present disclosure and not intended to limit the present disclosure. Any modification, equivalent replacement, or improvement made within the spirit and principle of the present disclosure shall fall within the protection scope of the present disclosure.

The invention claimed is:

1. A particle solar receiver, comprising:
   a feeding bin to temporarily store endothermic particles to be heated; and
   a multi-stage plate heat absorbing channel allowing the endothermic particles to flow along a predetermined path by gravity,
   the multi-stage plate heat absorbing channel comprising a plurality of plate-type structures which forms a changing flow direction of the endothermic particles between adjacent plate-type structures, wherein:
   the plurality of plate-type structures comprises any one of the following:
      the plurality of plate-type structures are all sandwich layers, the sandwich layers each have an upper plate and a lower plate, between which the endothermic particles are able to flow; or
      the plurality of plate-type structures are formed by combining the inclined plates and the sandwich layers, the sandwich layer has the upper plate and the lower plate, and the endothermic particles are able to flow on the inclined plate or in the sandwich layer; and
   wherein at least one of the plurality of plate-type structures is arranged to be directly exposed to and heated by concentrated solar power and is referred to as a direct irradiating plate, and the direct irradiating plate comprises at least the inclined plate or the lower plate of the sandwich layer.

2. The particle solar receiver according to claim 1, wherein the direct irradiating plate is modified according to any one of the following modification solutions or a free combination of the modification solutions:

modification of enhancing transmission, comprising at least using quartz glass as a direct irradiating plate material, modification of enhancing reflection, comprising at least using a ceramic reflective plate as a direct irradiating plate material, and modification of enhancing absorption, comprising at least coating a surface of the direct irradiating plate with a high temperature-resistant far infrared radiation coating.

3. The particle solar receiver according to claim 1, further comprising a baffle installed on at least one of the plurality of plate-type structures.

4. The particle solar receiver according to claim 1, further comprising:

an aperture forming an entrance of solar power into the particle solar receiver and arranged opposite to the multi-stage plate heat absorbing channel, and a transparent window detachably installed in the aperture, the transparent window comprises quartz glass.

5. The particle solar receiver according to claim 1, further comprising:

a temperature control device, connecting funnels receiving the endothermic particles coming from the multi-stage plate heat absorbing channel, and a storage bin connected to the connecting funnel.

6. The particle solar receiver according to claim 5, wherein:

the temperature control device comprises flow control valves, temperature sensors and at least one processor, the flow control valves are formed to be able to control an amount of the particles flowing through the connecting funnels, the temperature sensors are arranged at temperature measurement points of the connecting funnels and/or the multi-stage plate heat absorbing channel, and the at least one processor is connected to receive temperature signals from the temperature sensors and output control signals to the flow control valves.

7. The particle solar receiver according to claim 6, wherein the connecting funnels are arranged, and the flow control valves are also correspondingly arranged to respectively control the flow of particles passing through the corresponding connecting funnels so as to adjust the temperature of the particles at each part of the particle solar receiver.

8. A particle solar receiver, comprising:

a feeding bin to temporarily store endothermic particles to be heated; and a multi-stage plate heat absorbing channel allowing the endothermic particles to flow along a predetermined path by gravity, the multi-stage plate heat absorbing channel comprising a plurality of plate-type structures which forms a changing flow direction of the endothermic particles between adjacent plate-type structures;

wherein at least one of the plurality of plate-type structures is arranged to be directly exposed to and heated by the concentrated solar power and is referred to as a direct irradiating plate, and the direct irradiating plate comprises at least the inclined plate or the lower plate of the sandwich layer, and wherein the direct irradiating plate is modified according to any one of the following modification solutions or a free combination of the modification solutions:

modification of enhancing transmission, comprising at least using quartz glass as a direct irradiating plate material, modification of enhancing reflection, comprising at least using a ceramic reflective plate as a direct irradiating plate material, and modification of enhancing absorption, comprising at least coating a surface of the direct irradiating plate with a high temperature-resistant far infrared radiation coating.

9. A particle solar receiver, comprising:

a feeding bin to temporarily store endothermic particles to be heated;

a multi-stage plate heat absorbing channel allowing the endothermic particles to flow along a predetermined path by gravity, the multi-stage plate heat absorbing channel comprising a plurality of plate-type structures which forms a changing flow direction of the endothermic particles between adjacent plate-type structures;

connecting funnels receiving the endothermic particles coming from the multi-stage plate heat absorbing channel;

a storage bin connected to the connecting funnel;

a temperature control device, which comprises:

flow control valves formed to be able to control an amount of the particles flowing through the connecting funnels;

temperature sensors arranged at temperature measurement points of the connecting funnels and/or the multi-stage plate heat absorbing channel; and at least one processor connected to receive temperature signals from the temperature sensors and output control signals to the flow control valves.

*   *   *   *   *